(12) United States Patent
Orzechowski et al.

(10) Patent No.: US 11,194,335 B2
(45) Date of Patent: Dec. 7, 2021

(54) PERFORMANCE-BASED CLEANING ROBOT CHARGING METHOD AND APPARATUS

(71) Applicant: NEATO ROBOTICS, INC., Newark, CA (US)

(72) Inventors: Pawel Orzechowski, Los Gatos, CA (US); Joe Tate, San Jose, CA (US); Richard Wimmer, Redwood City, CA (US); Kiran Mohan, Newark, CA (US)

(73) Assignee: NEATO ROBOTICS, INC., Newark, CA (US)

(*) Notice: Subject to any disclaimer, the term of this patent is extended or adjusted under 35 U.S.C. 154(b) by 245 days.

(21) Appl. No.: 16/508,232

(22) Filed: Jul. 10, 2019

(65) Prior Publication Data

US 2020/0019178 A1   Jan. 16, 2020

Related U.S. Application Data

(60) Provisional application No. 62/696,253, filed on Jul. 10, 2018.

(51) Int. Cl.
*G05D 1/02* (2020.01)
*B25J 11/00* (2006.01)
*A47L 11/40* (2006.01)

(52) U.S. Cl.
CPC ........ *G05D 1/0217* (2013.01); *A47L 11/4011* (2013.01); *B25J 11/0085* (2013.01);
(Continued)

(58) Field of Classification Search
CPC ............. A47L 2201/022; A47L 9/2805; A47L 2201/04; A47L 9/2852; A47L 9/2873; A47L 9/009; A47L 9/2857; A47L 2201/06; A47L 9/2884; A47L 11/4011; A47L 9/2842; A47L 9/2894; A47L 11/4061; A47L 2201/00; A47L 2201/02; A47L 5/362; G05D 2201/0203; G05D 1/0225;
(Continued)

(56) References Cited

U.S. PATENT DOCUMENTS 5,646,494 A * 7/1997 Han ................. H02J 7/0036
                                                318/587
5,995,884 A * 11/1999 Allen ............... G05D 1/0225
                                                701/24

(Continued)

OTHER PUBLICATIONS

Jeon et al., Multiple robots task allocation for cleaning a large public space, 2015, IEEE, p. 315-319 (Year: 2015).*
(Continued)

*Primary Examiner* — McDieunel Marc
(74) *Attorney, Agent, or Firm* — Kilpatrick Townsend & Stockton LLP

(57) ABSTRACT

In one embodiment, a system and method is provided for optimizing the total time taken for cleaning an area by a cleaning robot, which is the sum of the cleaning time and the time taken for the robot to re-charge its battery mid-cleaning when the area is too large to clean on a single charge. In one embodiment, the remaining area to be cleaned is determined, and the mid-cleaning re-charge time is reduced to the amount of charge needed to clean the remaining area, plus a buffer. Hence, a reduction in mid-cleaning charging time results in reduced total time taken to clean a given space.

20 Claims, 8 Drawing Sheets

(52) U.S. Cl.
CPC ...... *G05D 1/0242* (2013.01); *A47L 2201/022* (2013.01); *A47L 2201/04* (2013.01); *G05D 2201/0203* (2013.01)

(58) Field of Classification Search
CPC ......... G05D 2201/0215; G05D 1/0242; G05D 1/0088; G05D 1/0274; G05D 1/0212; G05D 1/0217; G05D 1/0291; G05D 1/0219; B25J 11/0085; H02J 7/0045; H02J 7/0071
See application file for complete search history.

(56) References Cited

U.S. PATENT DOCUMENTS

| | | | | |
|---|---|---|---|---|
| 6,748,297 | B2* | 6/2004 | Song | G05D 1/0225 700/259 |
| 6,957,712 | B2* | 10/2005 | Song | A47L 9/2894 180/167 |
| 7,103,449 | B2* | 9/2006 | Woo | G05D 1/0255 700/251 |
| 7,332,890 | B2* | 2/2008 | Cohen | B25J 5/00 320/109 |
| 7,389,156 | B2* | 6/2008 | Ziegler | A22C 17/0013 318/568.1 |
| 7,620,476 | B2* | 11/2009 | Morse | A47L 5/14 15/319 |
| 8,855,914 | B1 | 10/2014 | Alexander et al. | |
| 8,903,589 | B2 | 12/2014 | Sofman et al. | |
| 8,996,172 | B2 | 3/2015 | Shah et al. | |
| 2014/0207282 | A1* | 7/2014 | Angle | G05B 15/02 700/257 |
| 2018/0133895 | A1* | 5/2018 | Kwak | H04W 4/029 |
| 2018/0311822 | A1* | 11/2018 | Ka | B25J 11/008 |

OTHER PUBLICATIONS

Aravind et al., A Control Strategy for an Autonomous Robotic Vacuum Cleaner for Solar Panels, 2017, IEEE, p. 53-61 (Year: 2017).*

Berenz et al., Risk and gain battery management for self-docking mobile robots, 2011, IEEE, p. 1766-1771 (Year: 2011).*

Jeon et al., Strategy for cleaning large area with multiple robots, 2013, IEEE, p. 652-654 (Year: 2013).*

* cited by examiner

| Run ID | Discovery | Clean mode | Navigation mode | Area cleaned | Fuel Percent | Fuel%/area. |
|---|---|---|---|---|---|---|
| 1 | 1 | Eco | Normal | 1500 | 120 | 0.08 |
| 2 | 0 | Turbo | Normal | 1490 | 126 | 0.0846 |
| 3 | 0 | Turbo | Normal | 1490 | 123 | 0.0825 |
| 4 | 0 | Turbo | Normal | 1496 | 120 | 0.0802 |
| 5 | 0 | ECO | Gentle | 1490 | 115 | 0.0772 |
| 6 | 0 | ECO | Gentle | 1495 | 111 | 0.0742 |
| 7 | 0 | Turbo | Gentle | 1490 | 130 | 0.0872 |
| Average | | ECO | Normal | 1500 | 120 | 0.08 |
| Average | | ECO | Gentle | 1492.5 | 113 | 0.0757 |
| Average | | Turbo | Normal | 1492 | 123 | 0.0824 |
| Average | | Turbo | Gentle | 1490 | 130 | 0.0872 |

FIG. 9

PERFORMANCE-BASED CLEANING ROBOT CHARGING METHOD AND APPARATUS

CROSS-REFERENCES TO RELATED APPLICATIONS

This application is a Nonprovisional patent application of Ser. No. 62/696,253 entitled "Performance-Based Cleaning Robot Charging Method and Apparatus," filed Jul. 10, 2018, the disclosure of which is hereby incorporated in its entirety.

BACKGROUND OF THE INVENTION

The present invention relates to re-charging a cleaning robot.

pack for their power requirements. Existing robot vacuum devices are smart enough to know that they are running out of power, and that they need to recharge their batteries to continue cleaning. Some devices are capable of autonomously navigating back to their charging stations, and getting their batteries recharged in order to continue cleaning. However, the question of how much or how long to charge for, before resuming cleaning has currently been addressed in a naïve way. Generally, a threshold for the charge percentage is fixed, and the robot charges up to the threshold, after which it is allowed to resume cleaning.

BRIEF SUMMARY OF THE INVENTION

The total time taken for cleaning an area by a cleaning robot is the sum of the cleaning time and the time taken for the robot to re-charge its battery mid-cleaning when the area is too large to clean on a single charge. In one embodiment, the remaining area to be cleaned is determined, and the mid-cleaning re-charge time is reduced to the amount of charge needed to clean the remaining area, plus a buffer. Hence, a reduction in mid-cleaning charging time results in reduced total time taken to clean a given space.

In one embodiment, the amount of charge needed for the remaining area is calculated based on a determination of the remaining area from the total area and the amount of charge actually used to clean a specified area. The amount of charge used is determined from a battery sensor connected to the battery for the cleaning robot. If the remaining area is unknown, such as for a first run or additional new areas being added, the re-charging defaults to charging up to a threshold at or below the maximum constant current charging level. In one embodiment, this threshold is between 70-95% of the total charge.

In one embodiment, a calculated amount of charge needed to clean the remaining area is modified by a factor corresponding to any change in cleaning or navigation mode, or any other mode. For example, more power, and thus more charge, is needed for faster brush speeds, higher vacuum suction power, slower or repeated movement over a dirty area, etc. In an alternate embodiment, actual battery charge used per area is measured and stored for different modes. The percentage of charge used per area clean is averaged over the most recent X cleanings.

In one embodiment, the aging of the battery is taken into account. As a battery ages, its capacity decreases. Although this wouldn't change the amount of charge used per area, it does change the percentage of the total charge used, since the battery has less total charge as it ages. By using percentage of charge used, instead of just charge used, the averaging over the most recent X cleanings automatically takes into account reduced battery capacity over time.

In one embodiment, the total area and/or remaining area to be cleaned can be updated at the time of or during a cleaning run. The calculations can be updated based on a map of the area. The map may include areas with carpet (requiring more energy) or hard floors, along with mode settings for all or portions of the area, and any virtual boundaries that may alter the navigation path to particular portions. The percentage of charge required is then updated by factoring in all of these variables.

BRIEF DESCRIPTION OF THE DRAWINGS

FIG. 9 is a table stored in memory to show the coverage area per amount of fuel or charge according to an embodiment.

DETAILED DESCRIPTION OF THE INVENTION

Overall Architecture

Figure 1:
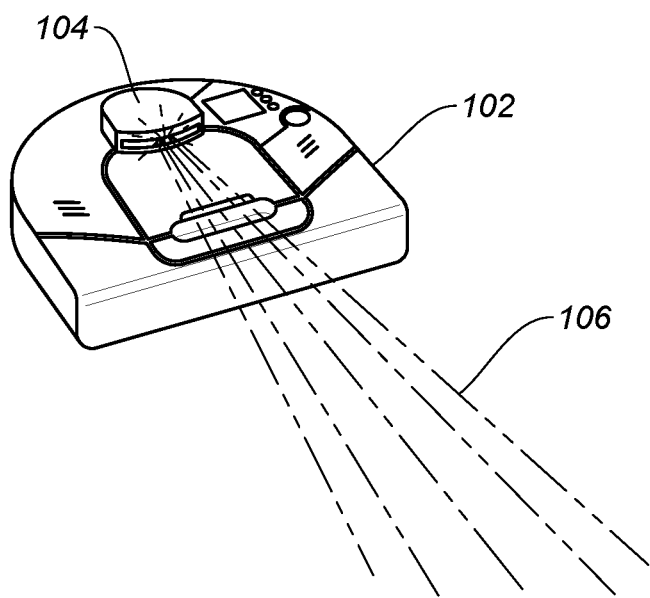
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. Alternately, VSLAM (Visual SLAM using image sensors) or other localization methods can be used. The collected data is also used to create a map, using a SLAM (Simultaneous Localization and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
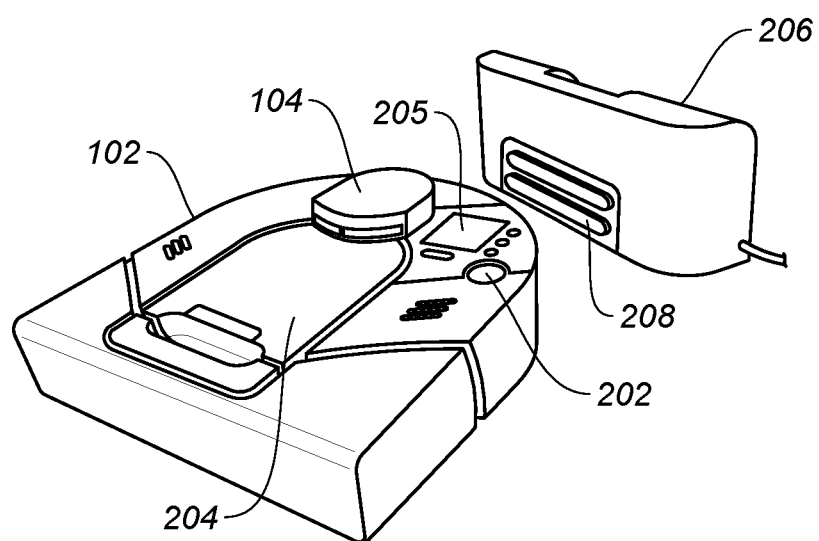
FIG. 2 is a diagram of a cleaning robot and charging station according to an embodiment.

FIG. 2 is a diagram of a cleaning robot and charging station according to an embodiment. Cleaning robot 102 with turret 10 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
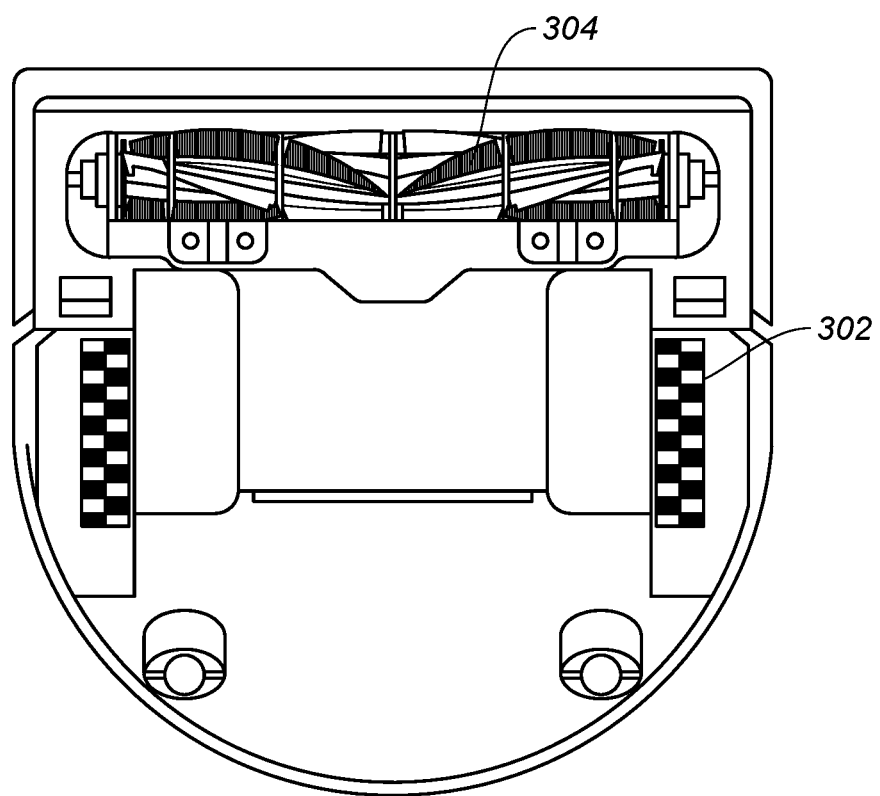
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
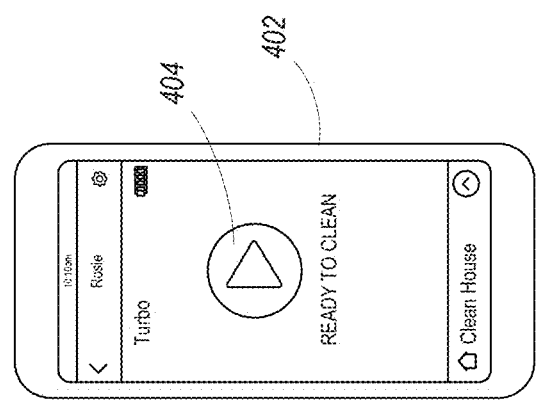
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
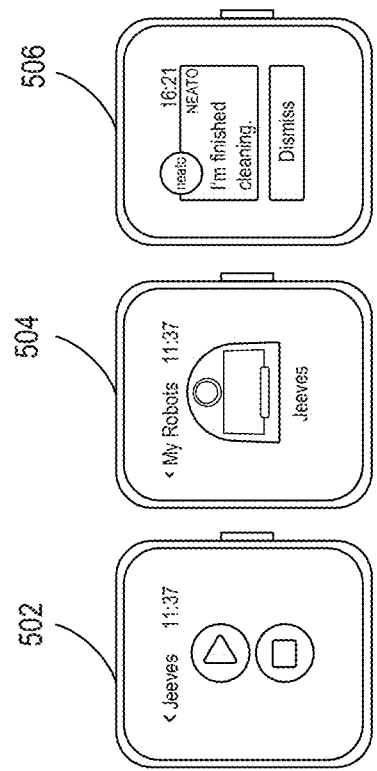
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
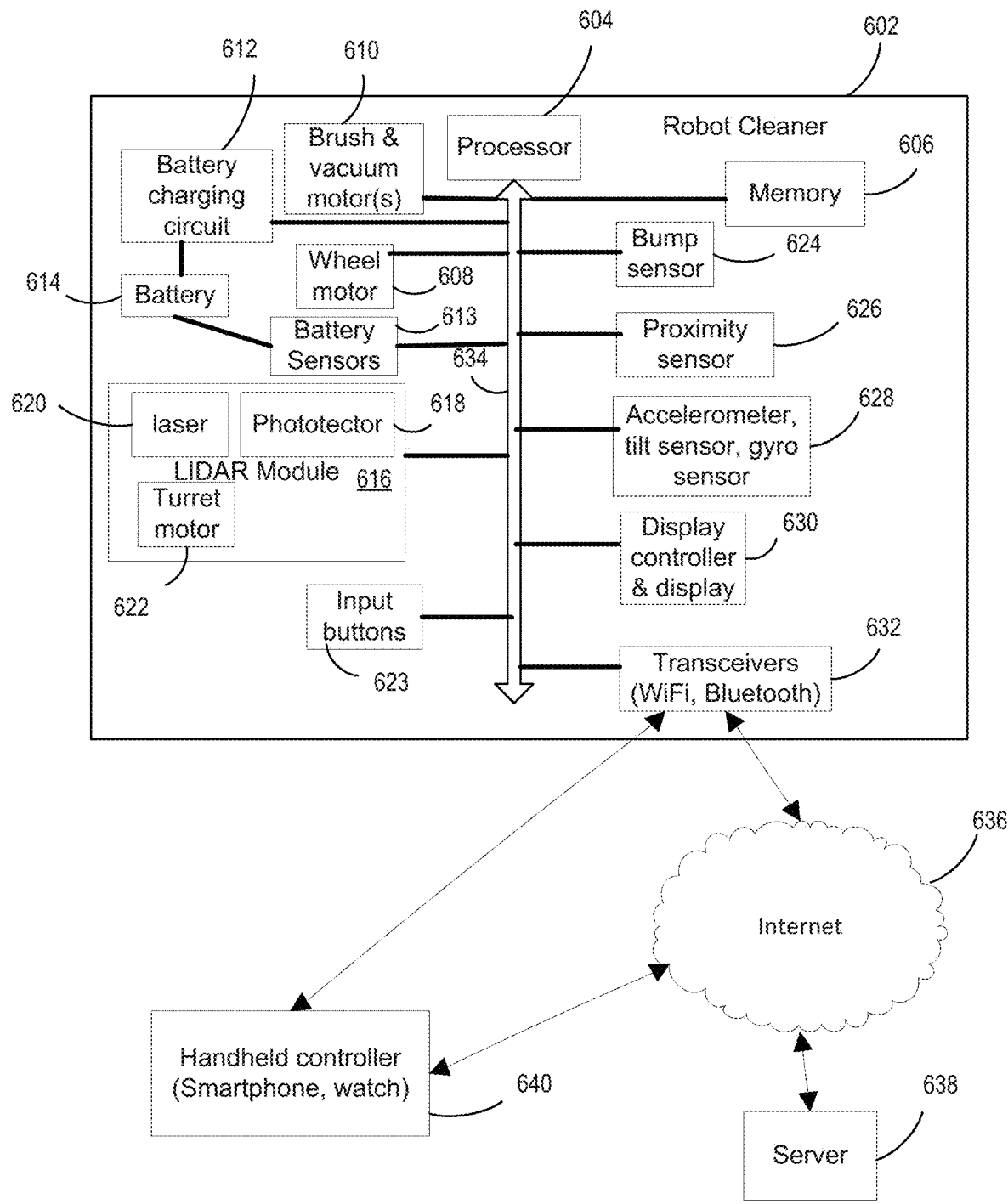
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. Alternately, an image sensor can be used with a VSLAM operation. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer/tilt/gyroscopic sensors 628, which indicate a drop-off (e.g., stairs) or a tilting of the cleaning robot (e.g., upon climbing over an obstacle). The robot can include either one of, or any combination of, a tilt sensor, accelerometer and gyroscopic sensor, and can contain multiple ones of each type of sensor. Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Battery sensors 613 monitor the battery state, such as charge level, temperature and voltage. The battery sensors 613 can be incorporated in battery charging circuit 612 in one embodiment. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
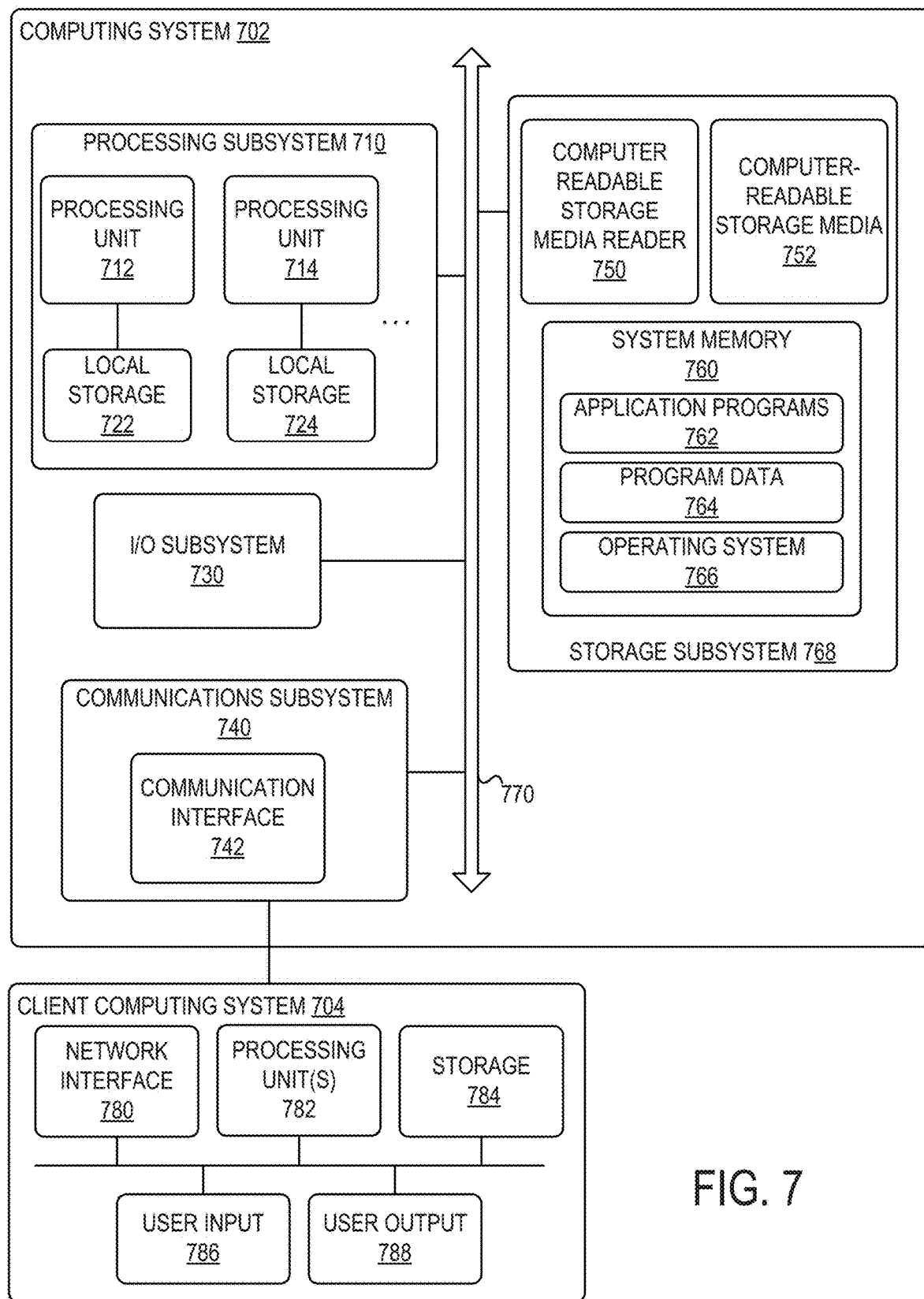
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Cleaning Robot Charging

An important performance metric for robotic vacuum cleaners is the total time it takes to complete cleaning a given space. This total time taken for cleaning is the sum of the cleaning time and the time taken for the robot to charge in between its cleaning session. Hence, a reduction in mid-cleaning charging time results in reduced total time taken to clean a given space. The total cleaning time is reduced by resuming cleaning as soon as the battery has charged up to just the required level.

Return to Base Charge Level

Additionally, estimating the charge level threshold which triggers a return-to-charge-base helps in optimizing the run-time of the robot. In one embodiment, when the robot triggers a return-to-base, it calculates the distance to the charge-base from its current location, and estimates how much charge is required to traverse that distance. If the current charge level is higher than the estimated charge required to return to base, then the robot continues to clean until it reaches the estimated charge level (plus some safety delta). Note that if the robot moves farther away as it continues to clean, the estimated charge level needed to return to base will be updated, and will be reached sooner. In one embodiment, a charge level of a low threshold between 5-15% of battery capacity is used to trigger a return to base absent a measurement of the actual current distance and charge required. A buffer of between 2-10% is added in one embodiment.

Default Charging Threshold

Figure 8:
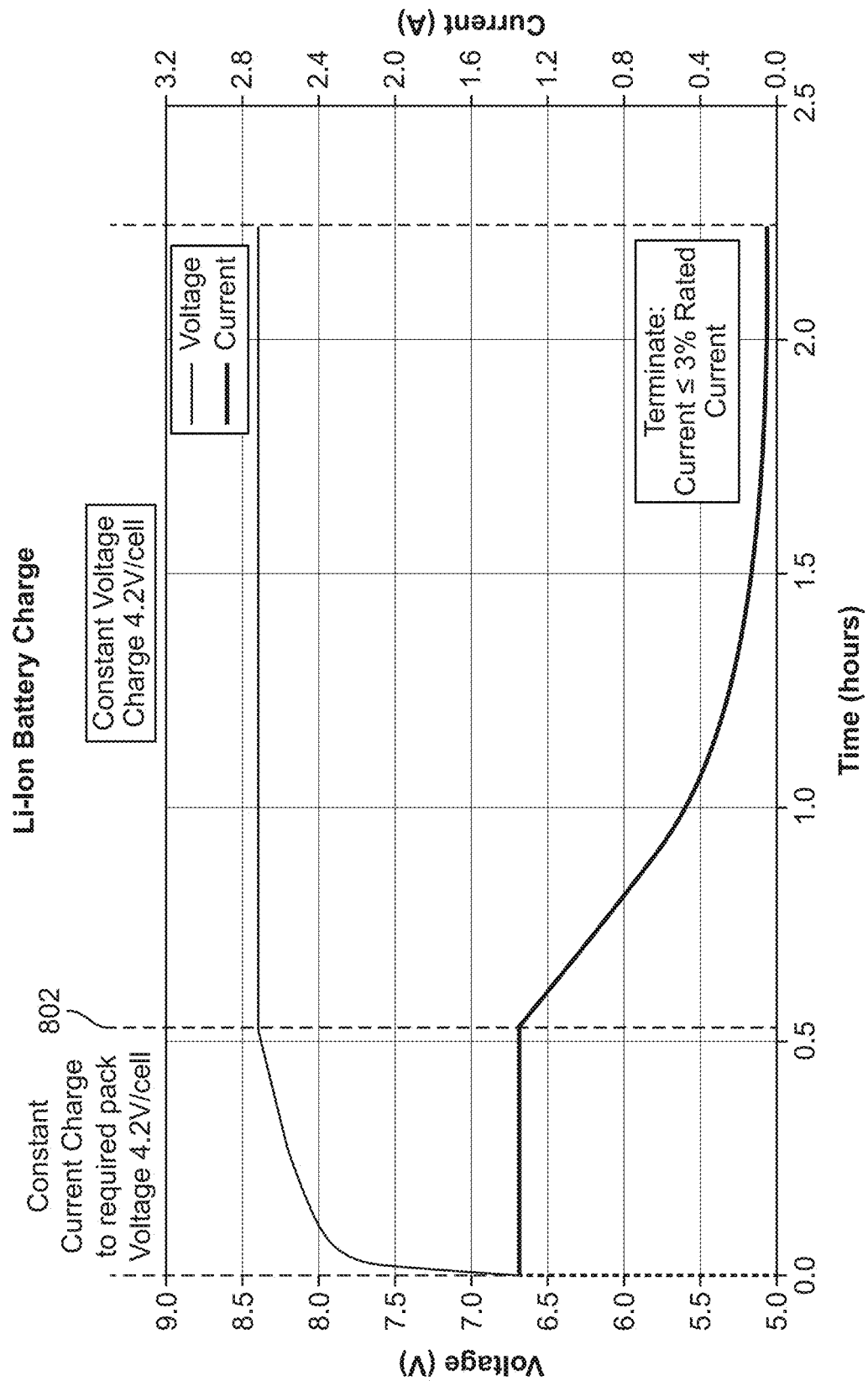
FIG. 8 is a diagram of a Li-Ion rechargeable battery charging time according to an embodiment.

In one embodiment, a default charging level is used absent data on the amount of charge needed for the remaining area to be cleaned. This will apply, for instance, on a first discovery run where the robot has not yet mapped an area. In order to minimize total time in this situation, a nearly full re-charge is used. However, since the last few percent of charge takes more time, charging is stopped before a full charge. The point of stopping charging is at or below the maximum constant current charging level. In one embodiment, this threshold is between 70-95% of the total charge. FIG. 8 illustrates this threshold as point 802.

In one embodiment, upon initial coupling to a charging base, the cleaning robot only charges up to a smaller initial threshold, so the customer can see it start cleaning sooner. This also has value if the discovery run determines the area to be cleaned is small, and does not require a full charge. The initial threshold is between 25-50% in one embodiment.

Example Case

Upon first use, a discovery cycle is used to map the area and clean at the same time. The very first time we do a discovery cycle to map the area, we use the default threshold of 80-95% to resume cleaning. Alternately, the threshold could be 70-98%. A table in the memory (database) of the robot cleaner is populated with data after the discovery run (consisting of a first run portion, a recharge, then a second run portion to finish the mapping and cleaning). An example is indicated in Table 1 below, showing the actual data in row 1, and the average in row 2. The average equals the row one data because there is only one measurement to measure at this point.

TABLE 1

| run# | cleanedArea | chargPercent | chargePercentPerCleanedArea |
|---|---|---|---|
| 1 (discovery) | 1500 | 120 | 0.08 |
| average | 1500 | 120 | 0.08 |

During the next navigation cleaning cycle, the robot starts cleaning, and after some cleaning time, the charge drops to the low threshold (5-15%). We use 7% in the example below. Cleaning is suspended, and the robot returns to base. A message is sent to the user, or displayed on the user app, indicating "Charging to continue." The robot then looks at how much cleaning it has done until then. Let's say that the robot cleaned 1100 units of area. As shown in the above table, the total area is 1500 units. The robot now assumes that it has 1500−1100=400 units of area left to clean. It also knows that it would take 0.08% to clean one unit of area. So its estimate for the remaining charge would be 400*0.08=32%. Since we trigger a return to base at 7%, we would actually need to charge up to 32+7=39%. To add some delta, just in case, we add 5% of extra charge. So we charge up to 39+5=44%.

Once this cleaning run completes, the robot adds the total area cleaned during this cycle, and the total charge percent used, to the above table 1. Let's say that the robot cleaned 1490 units of area using 122% fuel during the second run. The resulting table is shown below as table 2.

TABLE 2

| run# | cleanedArea | chargePercent | chargePercentPerCleanedArea |
|---|---|---|---|
| 1 (discovery) | 1500 | 120 | 0.08 |
| 2 | 1490 | 122 | 0.081879 |
| Average | 1495 | 121 | 0.08094 |

For the next cleaning run, the robot uses the average. The number of rows in the table would be 'n', which is the number of previous runs tracked. In one embodiment, only the last 5-10 runs are tracked in a circular buffer to keep the average data relatively current, by dropping older data.

Different Cleaning Modes

In one embodiment, a calculated amount of charge needed to clean the remaining area is modified by a factor corresponding to any change in cleaning or navigation mode, or any other mode. For example, more power, and thus more charge, is needed for faster brush speeds, higher vacuum suction power, slower or repeated movement over a dirty area, etc. In an alternate embodiment, actual battery charge used per area is measured and stored for different modes. The percentage of charge used per area cleaned is averaged over the most recent X cleanings.

In one embodiment, the modes are a Turbo mode for normal cleaning, and an ECO mode which has a lower vacuum power and lower brush speed. The ECO mode thus produces less noise, and may thus be less bothersome to a user. There may also be different navigation modes. A "Gentle" mode is slower, so that the robot doesn't bump into obstacles as hard, to avoid dinging walls and valuable furniture. There may be a variety of other modes, with different combinations of robot speed, brush power, vacuum power, etc. For example, a quick mode and a deep cleaning mode may be used for some or a portion of a floor plan.

FIG. 9 shows an example of a table which includes both cleaning modes (ECO and TURBO) and navigation modes (gentle, or normal). To calculate remaining cleaning time, the average time for the area for the same cleaning mode and same navigation mode is used. Thus, multiple averages are stored and updated in the memory. In the chart, the averages exclude the Discovery run (marked 1 in the Discovery column) if the modes don't match. Alternately, all the averages can include the Discovery run even if the mode doesn't match. In the example shown, the Discovery run uses the ECO clean mode to be quieter, and the Normal mode. Alternately, a more conservative approach would use Turbo mode, since that will take more power, and will insure that the calculations always provide enough power for the remaining area, even if the modes are switched. However, whether the discovery run is done in Eco or Turbo may be a decision that is left to the user.

In another embodiment, separate averages are not kept. Rather, a multiplier is applied to the average or the different modes. For example, if the discovery run was done in Eco mode and the first persistent cleaning run is done in turbo mode, the turbo mode average is determined by multiplying the eco mode average by 1.5 or some other factor.

Map Based Charging Mode

In one embodiment, the total area and/or remaining area to be cleaned can be updated at the time of or during a cleaning run. The calculations can be updated based on a map of the area. The map may include areas with carpet (requiring more energy) or hard floors, along with mode settings for all or portions of the area, and any virtual boundaries that may alter the navigation path to particular portions or close off particular areas. The percentage of charge required is then updated by factoring in all of these variables.

In one embodiment, the cleaning robot is wirelessly connected to a smart home hub. The hub monitors door lock and other data that affect the area to be cleaned. Before starting a cleaning run, the robot can thus check for any new virtual lines, locked doors, unlocked doors, or other information that changes the area to be cleaned. That data is then used to revise the total cleaning area and revise the optimum re-charging time.

In one embodiment, a route taken by the cleaning robot can be optimized to minimize recharging time by re-routing based on floor type, obstacles, likely return-to-base trigger location, etc. For example, depending on the floor plan, it may be optimal to clean hard surfaces such as a kitchen first. Also, carpet and areas with obstacles can be deferred, to allow the user the option to cut it short, yet clean main traffic areas, if the cleaning is taking too long.

In one embodiment, average percentage charge per area data from the cleaning robot and other robots is uploaded to a server. The data can include corresponding date on floor type, obstacle type, and cleaning modes. The server can aggregate the data and download an aggregate data to the cleaning robot and to a new cleaning robot. This information can be used instead of actual measured cleaning times, at least for the first discovery run after the total area is determined.

Battery Aging

In one embodiment, the aging of the battery is taken into account. As a battery ages, its capacity decreases. Although this wouldn't change the amount of charge used per area, it does change the percentage of the total charge used, since the battery has less total charge as it ages. By using percentage of charge used, instead of just charge used, the averaging over the most recent X cleanings automatically takes into account reduced battery capacity over time.

In one embodiment, the aging of the battery and the reduction in charge capacity is determined using a timer, and comparing to a table of battery charge capacity v. time. In a variation, two time periods are measured and stored in memory. One is the amount of time the battery is being used for operating the robot for cleaning and/or discovery. The other is the total amount of time the battery has been in use, or the resting time of the battery. Additional breakdowns of the data which may affect the battery estimated charge capacity include the amount of time the battery is being re-charged and the number of recharging cycles.

Change in Area Cleaned

In one embodiment, the program handles situations where the area to be cleaned changes. This could happen, for example, if after the discovery run, doors were closed, reducing the area during subsequent cleaning runs. Thus, during recent runs less area would be cleaned, making the average area lower than the discovery run's area. If the doors are subsequently opened, the robot will detect the open door or will notice it has cleaned more area than the average area (plus a delta tolerance of 1-10%, or 100-1000 sq. ft.). The robot will then revise the re-charging time. The program will first try using the area cleaned in the discovery run. If that also fails, the program, for this particular cleaning run, defaults to using the fixed 80-95% charging threshold.

Type of Battery and Battery Sensor

FIG. 6 shows a battery 614, a battery charging circuit 612, and battery sensors 613. Battery sensors 613 can be one or more sensors, such as a charge sensor and a temperature sensor. In one embodiment, a nickel-metal hydride (NiMH) battery is used. Alternately, any other type of rechargeable battery could be used, such as nickel-cadmium (NiCd), lithium-ion (Li-ion), lithium-ion polymer (Li-ion polymer) or lead-acid. A sensor is used to measure remaining battery capacity. In one embodiment, a battery pack is used. Inside the battery pack is a BMU (Battery management unit)—a small microcontroller that protects and operates the batteries. There's also a function processor that exchanges data with the BMU. The energy level of the battery is determined through current and voltage monitoring.

While there is some efficiency loss with a faster charge, a longer charge time can affect the life time, and thus specific charge profiles are used for faster charges, which stay within a certain temperature profile. A temperature sensor is included in the battery pack (alternately, a temperature sensor may be included for each battery cell), and differing charge profiles are used for different temperatures.

Charging Program

In one embodiment, the charging program is operated by processor 604, using a program stored in memory 606. The program consists of instructions on a non-transitory, computer readable medium. The data tables described herein are stored in memory 606. Memory 606 can be multiple memories, or the program and data can be stored in different portions of a single memory.

User Interface

Figures 10, 11:
FIGS. 10-11 are diagrams illustrating embodiments of a GUI for user feedback.

In one embodiment, the user is involved in determining the re-charging time. For example, the user may have company coming, and may decide to clean less than the whole house. FIG. 10 shows a user interface on a smart phone 1002. A notification box 1004 tells the user how much area can be cleaned based on the current level of charging. In the example shown, there is enough charge to clean the Living room and Dining room. Alternately, this can be showed graphically, such as by graying or coloring the areas on a floor plan map that can be charged based on a current charge level. In this example, the portions of the total area remaining to be cleaned were earlier labelled by the user on a map, or labeled automatically by object recognition (e.g., refrigerator object means it is the kitchen). If the user decides the living room and dining room are enough, the use can cut short the charging by pressing "Resume Clean" button 1006. A display box 1008 indicates the total time needed, both charging and cleaning, to finish cleaning the entire area. In this example, it is 55 minutes. If the user has company coming in 30 minutes, the user could decide to hit Resume Clean button 1006.

Another embodiment can provide the user with a variety of other options based on current charge, the charge that will be obtained in the next 5 minutes, etc. For example, the user can be informed when there is enough charge to clean designated high traffic areas. The high traffic areas can be areas the user designates on a map, or areas where the cleaning robot has detected more dirt in the past, using a dirt particle sensor in an intake area, or with another type of sensor. The user can also be notified when there is enough charge if the mode is changed (e.g., ECO to Turbo).

FIG. 11 shows another embodiment, with a graphical user interface (GUI) on the display 1103 of a smart watch 1102. On this GUI, a text box 1104 indicates that the cleaning robot is current recharging, and a bar 1106 indicates it is at 60% of full charge. The 60% in one embodiment reflects the percentage of up to the default charge threshold or the reduced threshold needed to finish cleaning, not the total battery capacity.

Battery Optimization Boundary Lines.

In one embodiment, the robot can draw temporary virtual boundaries to optimize battery life. For example, a robot may need several charging cycles for cleaning a large floor plan. The robot may determine, for example, that it would achieve a faster total cleaning time by drawing a virtual boundary that blocks off the last portion (say 20%) of a floor plan with obstacles. The user can then be presented with an abbreviated and complete cleaning times, so the user can elect which to use.

Multiple Robots.

In one embodiment, multiple cleaning robots are used and can share data on fuel percentage vs. area. Upon initial use, one robot can be designated as the training robot, mapping the area. The second ($3^{rd}$, $4^{th}$, etc.) robot can follow behind, doing a normal cleaning, and thus taking more time in each room or space. The training robot can transmit each room of the map as it is generated to the second robot, so the second robot need not do mapping and need not include the processing needed for mapping. This transmission can be direct, by way of a user device, or by uploading to a remote server which then downloads to the second robot. In one example, the new robot may be a replacement robot.

Other Embodiments

While the invention has been described with respect to specific embodiments, one skilled in the art will recognize that numerous modifications are possible. Embodiments of the invention may be realized using a variety of computer systems and communication technologies including but not limited to specific examples described herein. For example, embodiments of the invention can be applied to not just cleaning robots, but other robots, such as lawn mowing robots (certain areas may need mowing more often, or flowers may need to be avoided with a virtual boundary). Virtual boundaries can indicate what areas don't need to be monitored by a security robot, or don't need to be checked as often. Robots for measuring temperature, air quality, or other functions may similarly use virtual boundaries.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for operating a cleaning robot comprising:
   detecting a total area to be cleaned using sensors on the cleaning robot;
   initiating cleaning of the total area;
   returning to a charging base when a remaining charge level on a battery for the cleaning robot reaches a lower threshold;
   determining an area of a first portion of the total area cleaned upon reaching the lower threshold;
   determining a charge level used to clean the first portion by a processor in the cleaning robot;
   determining a remaining area to be cleaned by subtracting the first portion from the total area to be cleaned;
   determining a sufficient amount of charge level needed to clean the remaining portion;
   charging the battery to the sufficient amount of charge level plus a buffer amount of charge level greater than an amount of charge level the cleaning robot will need to return to the charging base from the remaining area to be cleaned; and
   leaving the charging base and cleaning the remaining area to be cleaned upon charging the battery to the sufficient amount of charge level plus the buffer amount of charge level.

2. The method of claim 1 further comprising:
   storing in a memory the average percentage of charge required per area cleaned for a plurality of cleaning runs.

3. The method of claim 1 wherein the charge level is a percentage of charge.

4. The method of claim 1 further comprising:
   determining a cleaning mode as selected by a user; and
   modifying the determining a sufficient amount of charge level needed to clean the remaining portion based on the cleaning mode.

5. The method of claim 1 wherein the remaining amount of charge on the battery is determined from a battery sensor coupled to the processor.

6. The method of claim 1 further comprising:
   when the remaining area is unknown, defaulting to charging up the battery to a threshold at or below the maximum constant current charging level of the battery.

7. The method of claim 1 further comprising:
   when the remaining area is unknown, defaulting to charging up the battery to a threshold of between 70-95% of the total charge.

8. The method of claim 1 further comprising:
updating the remaining area to be cleaned at the time of or during a cleaning run.

9. The method of claim 8 wherein the updating is based on changes to a map of the area to be cleaned.

10. The method of claim 1 further comprising:
upon first use, using a discovery cycle to map the area and clean at the same time, and charging the battery to a default threshold of 80-95% of charge level to resume cleaning.

11. A cleaning robot, comprising:
a robot housing;
a motor mounted in the housing for moving the cleaning robot;
a battery connected to provide electrical power to the motor;
a charge level battery sensor connected to the battery;
a recharging connector coupled to the battery;
a sensor mounted in the robot for detecting surroundings;
a processor mounted in the robot;
a memory in the robot;
a localization module in the robot;
non-transitory, computer-readable code in the memory having instructions for:
detecting a total area to be cleaned using sensors on the cleaning robot;
initiating cleaning of the total area;
returning to a charging base when a remaining charge level on a battery for the cleaning robot reaches a lower threshold;
determining an area of a first portion of the total area cleaned upon reaching the lower threshold;
determining a charge level used to clean the first portion by a processor in the cleaning robot;
determining a remaining area to be cleaned by subtracting the first portion from the total area to be cleaned;
determining a sufficient amount of charge level needed to clean the remaining portion;
charging the battery to the sufficient amount of charge level plus a buffer amount of charge level greater than an amount of charge level the cleaning robot will need to return to the charging base from the remaining area to be cleaned; and
leaving the charging base and cleaning the remaining area to be cleaned upon charging the battery to the sufficient amount of charge level plus the buffer amount of charge level.

12. The cleaning robot of claim 11 wherein the non-transitory, computer-readable code in the memory further comprises instructions for:
storing in the memory the average percentage of charge required per area cleaned for a plurality of cleaning runs.

13. The cleaning robot of claim 11 wherein the non-transitory, computer-readable code in the memory further comprises instructions for:
determining a cleaning mode as selected by a user; and
modifying the determining a sufficient amount of charge level needed to clean the remaining portion based on the cleaning mode.

14. The cleaning robot of claim 11 wherein the non-transitory, computer-readable code in the memory further comprises instructions for:
when the remaining area is unknown, defaulting to charging up the battery to a threshold at or below the maximum constant current charging level of the battery.

15. The cleaning robot of claim 11 wherein the non-transitory, computer-readable code in the memory further comprises instructions for:
when the remaining area is unknown, defaulting to charging up the battery to a threshold of between 70-95% of the total charge.

16. The cleaning robot of claim 11 wherein the non-transitory, computer-readable code in the memory further comprises instructions for:
upon first use, using a discovery cycle to map the area and clean at the same time, and charging the battery to a default threshold of 80-95% of charge level to resume cleaning.

17. The cleaning robot of claim 11 wherein the non-transitory, computer-readable code in the memory further comprises instructions for:
updating the remaining area to be cleaned at the time of or during a cleaning run.

18. The cleaning robot of claim 17 wherein the updating is based on changes to a map of the area to be cleaned.

19. A cleaning robot, comprising:
a robot housing;
a motor mounted in the housing for moving the cleaning robot;
a battery connected to provide electrical power to the motor;
a charge level battery sensor connected to the battery;
a recharging connector coupled to the battery;
a sensor mounted in the robot for detecting surroundings;
a processor mounted in the robot;
a memory in the robot;
a localization module in the robot;
non-transitory, computer-readable code in the memory having instructions for:
detecting a total area to be cleaned using sensors on the cleaning robot;
initiating cleaning of the total area;
returning to a charging base when a remaining charge level on a battery for the cleaning robot reaches a lower threshold;
determining an area of a first portion of the total area cleaned upon reaching the lower threshold;
determining a charge level used to clean the first portion by a processor in the cleaning robot;
determining a remaining area to be cleaned by subtracting the first portion from the total area to be cleaned;
determining a sufficient amount of charge level needed to clean the remaining portion;
charging the battery to the sufficient amount of charge level plus a buffer amount of charge level greater than an amount of charge level the cleaning robot will need to return to the charging base from the remaining area to be cleaned;
leaving the charging base and cleaning the remaining area to be cleaned upon charging the battery to the sufficient amount of charge level plus the buffer amount of charge level;
storing in the memory the average percentage of charge required per area cleaned for a plurality of cleaning runs;
determining a cleaning mode as selected by a user;

modifying the determining a sufficient amount of charge level needed to clean the remaining portion based on the cleaning mode; and when the remaining area is unknown, defaulting to charging up the battery to a threshold at or below the maximum constant current charging level of the battery.

20. The cleaning robot of claim 11 wherein the non-transitory, computer-readable code in the memory further comprises instructions for:

upon first use, using a discovery cycle to map the area and clean at the same time, and charging the battery to a default threshold of 80-95% of charge level to resume cleaning.

* * * * *